United States Patent
Redmer et al.

(10) Patent No.: US 9,221,288 B2
(45) Date of Patent: Dec. 29, 2015

(54) PRINTING PROCESS AND SYSTEM FOR ASCERTAINING REGISTER DEFECTS

(75) Inventors: Eberhard Redmer, Ascheberg (DE); Günter Streitmatter, Neuss (DE)

(73) Assignee: HEIDELBERGER DRUCKMASCHINEN AG, Heidelberg (DE)

( * ) Notice: Subject to any disclaimer, the term of this patent is extended or adjusted under 35 U.S.C. 154(b) by 207 days.

(21) Appl. No.: 13/429,715

(22) Filed: Mar. 26, 2012

(65) Prior Publication Data

US 2012/0240801 A1 Sep. 27, 2012

(30) Foreign Application Priority Data

Mar. 24, 2011 (DE) .......................... 10 2011 014 913

(51) Int. Cl.
| | |
|---|---|
| *B41F 13/12* | (2006.01) |
| *B41M 1/14* | (2006.01) |
| *B41F 13/02* | (2006.01) |
| *H04N 1/50* | (2006.01) |
| *B41F 33/00* | (2006.01) |

(52) U.S. Cl.
CPC ................ *B41M 1/14* (2013.01); *B41F 13/025* (2013.01); *B41F 13/12* (2013.01); *B41F 33/0081* (2013.01); *H04N 1/508* (2013.01); *B41P 2213/90* (2013.01); *B41P 2233/52* (2013.01)

(58) Field of Classification Search
CPC ...... B41F 13/025; B41F 33/081; B41F 13/12; B41P 2213/90; B41P 2233/52
USPC ........................................................ 101/481
See application file for complete search history.

(56) References Cited

U.S. PATENT DOCUMENTS

| | | | | |
|---|---|---|---|---|
| 4,532,596 | A | * | 7/1985 | Pugsley .......................... 700/125 |
| 6,024,504 | A | | 2/2000 | Weichmann et al. |
| 6,112,658 | A | * | 9/2000 | Gunther et al. ................ 101/171 |

(Continued)

FOREIGN PATENT DOCUMENTS

| | | |
|---|---|---|
| DE | 197 24 066 A1 | 12/1998 |
| DE | 10 2008 001 367 A1 | 10/2009 |
| DE | 10 2009 019 591 A1 | 12/2009 |
| DE | 10 2010 049 945 A1 | 5/2011 |

OTHER PUBLICATIONS

German Patent and Trademark Office Search Report, Dated Nov. 10, 2011.

*Primary Examiner* — Jill Culler
(74) *Attorney, Agent, or Firm* — Laurence Greenberg; Werner Stemer; Ralph Locher

(57) ABSTRACT

Printing material printing processes generate a raster bit map manipulated by matrix manipulation to compensate for geometrical distortions of the printed image on the printing material. First of all, the same correction functions are used for following raster bit maps, if the intention is to dispense with the imaging of test printing forms. Measuring marks are also printed, while printing is underway, at fixed positions on a sheet to establish any present register defects. Different repeat configurations for follow-up printing means that it is no longer possible for the measuring marks to be provided at the same positions. The ascertained deviations are used to interpolate adjusted deviations at the first positions for the first measuring marks to make it possible to use the second measuring marks at the shifted positions. Further technical measures are then implemented on this basis. A printing system for printing a printing material is also provided.

11 Claims, 4 Drawing Sheets

(56) References Cited

U.S. PATENT DOCUMENTS

| | | |
|---|---|---|
| 6,253,678 B1 | 7/2001 | Wentwort |
| 2005/0249380 A1* | 11/2005 | Geissler et al. ............... 382/112 |
| 2006/0238817 A1 | 10/2006 | Tasaka et al. |
| 2008/0250961 A1* | 10/2008 | Sugiyama et al. ............ 101/481 |
| 2011/0079160 A1* | 4/2011 | Hauck et al. .................. 101/481 |

* cited by examiner

US 9,221,288 B2

PRINTING PROCESS AND SYSTEM FOR ASCERTAINING REGISTER DEFECTS

CROSS-REFERENCE TO RELATED APPLICATION

This application claims the priority, under 35 U.S.C. §119, of German Patent Application DE 10 2011 014 913.9, filed Mar. 24, 2011; the prior application is herewith incorporated by reference in its entirety.

BACKGROUND OF THE INVENTION

Field of the Invention

The present invention relates to a process for printing a printing material, wherein a first printing copy is coupled to first measuring marks for ascertaining register deviations, the first measuring marks are assigned to first positions, the first positions are each disposed outside motif regions or repeats of the first printing copy, first color separations are generated by screening the first printing copy together with the first measuring marks, first printing formes are imaged on the basis of the first color separations, the first printing formes are used for printing a printing material in a printing machine, the first measuring marks are measured on the printed printing material and first deviations of the first measuring marks are ascertained, with the first deviations constituting a measure of register deviations between the color prints, a first correction function is determined on the basis of the first deviations, and the first correction function is used to adjust the first color separations and/or printing formes to the register deviations and thus at least to reduce the register defects.

The invention also relates to a printing system for printing a printing material, including a printing machine, a printing-forme-imaging device, a Raster Image Processor (RIP) for screening printing copies and generating color separations, and first input fields for inputting the first deviations of a non-corrected print for carrying out a process according to the invention.

In processes for printing materials, it is already known that at least one printing copy, which forms the basis for the printed image, is generated, the printing copy is screened and at least one raster bit map is generated. The raster bit map is present in the form of a matrix with m lines and n columns, the elements of which contain information regarding a color which is to be printed, and the raster bit map is manipulated through the use of matrix manipulation so as to compensate for geometrical distortions of the printed image on the printing material.

Reproduction technology generates the printing copies for printed pages, which contain all of the elements, such as texts, graphics and images, that are to be printed. In the case of the printing copies being produced electronically, those elements are present in the form of digital data. For an image, the data is, for example, generated by the image being scanned, dotwise and linewise, in a scanner, with each pixel being split into color components and the color values of those components being digitized. Images in a scanner are usually split into the color components of Red, Green and Blue (RGB). In the case of four-color printing, those components are then transformed further into the printing colors Cyan, Magenta, Yellow and Key (black) (CMYK).

As processing continues, the digitized texts, graphics and images are made up into a printed page in a processing station, with visual monitoring on a color monitor or automatically, in accordance with stored layout specifications. The printed page is then described in a data format, e.g. in the page description language PostScript or as a PDF, and stored. In order to produce a printing plate for each printing color, the printing-page data include color-separation data for each of the printing colors CMYK. The color-separation data are recorded, using a film recorder or plate recorder, in very high resolution on film material or directly on printing plates. There are also digital printing machines which operate without printing plates. In that case, the color-separation data are transferred directly to the digital printing machine and printed out there on the printed material.

The color-separation data are converted, for the purpose of recording on film material or printing plates, in a Raster Image Processor (RIP), into high-resolution bit map data, wherein differently sized dots are generated for the different density values of the colors. The result is a high-resolution binary image with just two brightness values per pixel (black and white). Such an image is referred to as a bit map or as a raster bit map.

The raster bit map generated in that way is passed on to a platesetter, where a printing plate is exposed on the basis of the information of the raster bit map.

If the printing plate generated in that way is used in a printing machine, depending on the type of printing plate being used, ink is transferred onto a printing material from the exposed or the unexposed pixels of the printing plate.

The printing material is guided through a corresponding printing nip, where it has the ink applied to it for printing purposes. The more ink applied to the printing material, the moister the latter becomes, and it is distorted geometrically as it passes through various printing nips. That gives rise to geometrical distortion, as is illustrated in FIG. 1. The printing material, e.g. paper, is distorted trapezoidally, as is the printed image applied to the printing material. During the operation of printing sheets, that distortion increases in the form of a stretch from the leading edge to the trailing edge. That phenomenon is generally also referred to as fan out. If more than one color is printed in the printing machine, then the paper stretch changes from printing unit to printing unit and the individual color separations, if not compensated for, are no longer printed in register one above the other.

German Patent Application DE 10 2009 019 591 A1 discloses a compensation process which, for the purpose of compensating for the paper stretch, gives rise to a physical effect on the printing plates clamped in the printing machine, in that those printing plates are expanded or compressed in dependence on a detected stretch of the paper in the respective printing unit.

For the purpose of compensating for the geometrical defects, it is also known, from German Patent DE 197 24 066 B4, corresponding to U.S. Pat. No. 6,024,504, to feed the raster bit map to a matrix-manipulation device, through the use of which the raster bit map itself is distorted by matrix manipulation contrary to the expected distortion of the printing material. In the matrix-manipulation device, geometrical-defect correction is carried out through the use of individual functions which are applied to the matrix which represents the raster bit map. Reference will therefore be made hereinbelow to German Patent DE 197 24 066 B4, corresponding to U.S. Pat. No. 6,024,504 with respect to a possible correction process for compensating for the paper stretch. It is also possible for all of the individual functions taken as a whole, in particular in relation to the present invention, to be referred to as a correction function.

In order for it to be possible to implement a corresponding correction of the paper stretch in the raster bit map, it is necessary to know the parameters which describe the stretch of the paper or of a printing material in general. For that purpose, German Patent DE 197 24 066 B4, corresponding to U.S. Pat. No. 6,024,504 proposes that, specifically for those measuring operations, elements are added-in when the printed image is being composed or already present Nonius elements and electronically evaluatable position markings, which are already provided in normal production, are measured and evaluated or suitable elements in the printed image, i.e. in the subject itself, are measured. Suitable elements proposed therein are edge points or already present register elements.

A person skilled in the art in that case knows how such distortions of a printing material can be ascertained from specific measuring elements or already present positioning markings or Nonius elements. It is more problematic, however, to measure suitable elements of the subject itself in order to draw conclusions therefrom as to the paper or printing-material stretch or the geometric defects of the printed image.

German Patent Application DE 10 2009 019 591 A1 discloses further measuring marks which allow an operator to ascertain straightforwardly by visual measures the register deviations between the color separations in multi-color printing. It is provided in that case that those measuring marks are provided at 9 positions on a sheet of the printing material. The measuring marks can then be read out by an operator, e.g. with the aid of a magnifying glass, and give numerical values which describe the register deviations of the color separations in those regions. The deviations of the measuring marks are then entered in an input mask corresponding to the position of the measuring marks on the sheet. The number of 9 measuring marks in that case is purely used by way of example. It is also possible to use more or fewer measuring marks. Corresponding input fields have to be provided in dependence on the number of measuring marks. The input fields in that case are assigned in each case precise positions of the measuring marks on the sheet.

A computer is then used to ascertain the necessary measures for correcting the paper stretch in dependence on the thus ascertained deviations of the register for the individual color separations, by way of stored algorithms, and those measures are passed on to a control device and have a corresponding physical effect on the plates. It is also possible for those correction measures to be referred to generally, in relation to the present invention, as a correction function.

Of course, the register deviations ascertained according to German Patent Application DE 10 2009 019 591 A1 can also be used in order to counteract a paper-web stretch using a matrix-manipulation device, as is known from German Patent DE 197 24 066 B4, corresponding to U.S. Pat. No. 6,024,504.

Such detected register deviations, which are attributable, for example, to the paper stretch, can be passed on to the platesetter, or generally to a printing-forme-imaging device, for exposing a printing plate or for imaging a printing forme, in the manner described, either in physical form by acting on the sheet or at the software level by acting on the raster bit map, or else also at the software level by acting on the printing copy or by way of certain specifications.

In the prior art, the parameters for determining the paper stretch have to be ascertained first of all by a set of printing formes being produced and being used in a printing process. There is then still no paper-stretch compensation used in this printing process and in this production of the printing formes. Due to register deviations detected through the use of measuring marks, it is then possible to counteract the paper stretch by one of the above-described processes through the use of a correction function. In particular, in the case of the counteracting operation being implemented at software level, new printing, e.g. new printing plates, are then produced with the inclusion of paper-stretch compensation.

In order to implement paper-stretch compensation which is as precise as possible, a new, non-compensated set of printing would have to be generated for each individual new printing copy. That is associated with considerable costs. It is therefore generally not the case that the described process is carried out anew, with the production of non-compensated printing, but that the parameters obtained from the first printing copy are also used to compensate for the paper stretch in the second printing copy and in printing copies beyond that.

It is also known for the measuring marks in German Patent Application DE 10 2009 019 591 A1 to be printed in each printing process. By evaluating those measuring marks, with the use of further printing copies, it is then possible to detect whether or not there are further register deviations. Those register deviations may then be corrected, possibly by physical measures, or be avoided by new printing being produced.

Since the algorithm for ascertaining the correction function or compensation function depends on the detected register deviations of the measuring marks in their predetermined first positions, it is no longer possible to precisely ascertain the paper-stretch parameters if use is made of further printing copies which are formed in such a way that the measuring marks can no longer be provided at the first positions. In addition, it is not possible for an operator, by straightforwardly ascertaining the register deviations at the measuring marks, to pass judgment on the register accuracy, since that is only ever really meaningful for the predetermined first positions of the measuring marks.

SUMMARY OF THE INVENTION

It is accordingly an object of the invention to provide a printing process and a system for ascertaining register defects, which overcome or at least counteract the hereinafore-mentioned disadvantages of the heretofore-known processes and systems of this general type.

With the foregoing and other objects in view there is provided, in accordance with the invention, a process for printing a printing material. The process comprises coupling a first printing copy to first measuring marks for ascertaining register deviations, assigning the first measuring marks to first positions, placing each of the first positions outside motif regions or repeats of the first printing copy, generating first color separations by screening the first printing copy together with the first measuring marks, imaging first printing formes based on the first color separations, printing a printing material in a printing machine using the first printing formes, measuring the first measuring marks on the printed printing material and ascertaining first deviations of the first measuring marks, with the first deviations constituting a measure of register deviations between color prints, determining a first correction function based on the first deviations, using the first correction function to adjust at least one of the first color separations or printing formes to the register deviations and thus at least to reduce register defects, assigning second measuring marks at second positions to second printing copies, generating second color separations by screening the second printing copies with the second measuring marks, imaging second printing formes based on the second color separations, printing a printing material in a printing machine using the second printing formes, using the first correction function before, during or after the screening of the color separations or the imaging of the printing formes, ascertaining second deviations of the second measuring marks at the second positions, determining adjusted deviations of the first measuring marks at the first positions based on the second deviations of the second measuring marks, and implementing at least one further technical measure using the adjusted deviations.

For this purpose, it is provided, in the first instance, that second measuring marks at second positions are generated for second printing copies.

The second positions in this case can take into account the type of printing copy and may be different, at least in part, from the first positions, at which the first measuring marks were provided. In particular, it is also possible to provide other measuring marks at these second positions, i.e. second measuring marks, which are different from the first measuring marks. Their only consideration is the suitability thereof for the purpose of ascertaining the register deviations. In particular, it is possible to use higher-resolving second measuring marks.

These second printing formes are then used as a basis to image second color separations, which are generally themselves also referred to as second color separations. These second color separations are then used in a printing machine for imaging or printing a printing material.

According to the invention, it is provided in this case that, for the purpose of generating the color separations, i.e. the printing, the correction function ascertained in a first process is used for the purpose of generating the printing. As described above, this correction can be applied directly to the printing copy before the operation of screening the color separations, during the operation of screening the color separations or also thereafter, during the operation of imaging the printing formes themselves. It is preferable, however, to use matrix manipulation as used in German Patent DE 197 24 066 B4, corresponding to U.S. Pat. No. 6,024,504, which is incorporated herein by reference and to which reference is also hereby made with respect to implementing the matrix manipulation.

The second measuring marks are located at second positions, which are predetermined. The first correction function means that a first correction of the register deviations has also been implemented at these second positions. Changes over time or changes due to the printing forme being used, or further changes in the vicinity of the printing machine or of the platesetter, or as a result of the second printing copy itself, may then result in ascertainable register deviations in the region of the second measuring marks. These second deviations of the second measuring marks at the second positions are ascertained, and the second deviations of the second measuring marks are used to determine adjusted deviations of the first measuring marks at the first positions. The adjusted deviations determined in this way can then be used, without defects or errors caused by using different measuring marks or by measurements at different positions, for the purpose of implementing at least one further technical measure.

This further technical measure may be an individual measure or a combination of measures. The individual measures, which may also be combined into combinations, are formed in this case, for example, of the adjusted deviations determined in this way being represented as a numerical value on a monitor. An operator can then decide himself or herself, due to the numerical value displayed, as to whether a further correction is necessary or as to whether further measures have to be taken. It is also generally possible, overall, to provide authorization elements for authorizing further technical measures for activation by a user.

Instead of, or in addition to, displaying a numerical value, the adjusted deviations may also be represented as graphic illustrations of the first measuring marks on a monitor. This means that there is no need for an operator to rethink if he or she uses the second measuring marks in the first instance, but can then assess first measuring marks, as is customary, on a monitor.

It may also be provided as an alternative, or in addition, that optical or acoustic signals are emitted when one or more of the adjusted deviations, individually or together, exceed a predetermined limit value. Taking a number of adjusted deviations together is intended to be understood, for example, as averages or sums of adjusted deviations of the first measuring marks at the first positions.

It is possible as an alternative, or in addition, in particular following authorization of the user by activation of the authorization elements, to provide that the adjusted deviations are used in order to determine an adjusted correction function. Through the use of this correction function, it is then also possible, using second measuring marks at second positions, to correct the paper stretch on the basis of values at the first positions, which would be established by first measuring marks. The correction function can then be used, for example as described in German Patent Application DE 10 2009 019 591 A1, to achieve a physical effect in the form of compressing or expanding the printing plates. For this purpose, reference is made, with respect to the physical effect on the printing plates, to German Patent Application DE 10 2009 019 591 A1. However, as an alternative, or in addition, it is also possible to use the correction function in order to adjust second color separations and/or printing formes, or color separations and/or printing formes beyond that, to the thus ascertained register deviations and thus to further reduce the register defects of this printing process, or printing processes beyond that.

It is possible to provide different interpolation functions in order to determine the adjusted deviations from the second deviations. For example, a linear interpolation function, or preferably the first correction function itself, is provided for use in determining the adjusted deviation. The first correction function in this case already takes into account some of the paper stretch or the regularity thereof.

The process steps described are generally suitable for correcting register deviations between the individual color separations, but preferably the register deviations which should be corrected are those generated due to the paper stretch in the individual printing units as a result of the dampness of the ink being applied.

In order to ascertain the adjusted deviations in as straightforward a manner as possible, it is provided that the second positions, rather than being selected arbitrarily, are predetermined by an operator within the pre-press stage, in the vicinity of a platesetter or else in the vicinity of a printing machine itself or of a Management Information System (MIS). It is necessary in this case for the precise second positions either to be input or, as an alternative, they may also be selected from values proposed by a computer system. The second positions in this case should be provided in a motif-free region of the printing copy. Selection in this case can be understood as meaning that various numerical data are displayed, or also that the positions which are possible for the second measuring marks are displayed on a corresponding monitor, for example with a touch screen function, and the operator indicates the correspondingly preferred second positions simply by touching the monitor.

In order for it to be possible for the adjusted deviations to be ascertained from the measured second deviations of the second measuring marks by an appropriately configured printing system, it is necessary for the second positions to be transferred to this printing system. This can be done according to the invention by these second positions being input directly into the printing system, preferably in the region of a printing machine, or by these second positions being sent, within a file or a data stream, directly to the printing machine or to the position in the printing system at which the process is carried out. This file or this data stream in this case may also be transferred indirectly, through a Management Information System (MIS), to the printing machine or to the printing system or to a correspondingly provided calculating device for calculating the adjusted deviations from the second deviations.

The second deviations are detected on a printed printing material. In order for it to be possible for these second deviations to be used as quickly as possible for the purpose of ascertaining adjusted deviations, it is provided according to the invention that these second positions and/or second deviations are input at an operating console of the printing machine and the further technical measures are implemented in the vicinity of the printing machine.

In a particularly straightforward embodiment, the first and second measuring marks are identical.

With the objects of the invention in view, there is also provided a printing system for printing a printing material. The printing system comprises a printing machine, a printing-forme-imaging device, a raster image processor for screening printing copies and generating color separations, first input fields for inputting first deviations of a non-corrected print for carrying out a process according to the invention, second input fields for inputting or determining the second positions of the second measuring marks and/or third input fields for inputting the second deviations of the second measuring marks at the second positions, and a calculating system for calculating adjusted deviations from the second deviations in conjunction with the second positions.

This printing system should have input fields at least for inputting the second positions of the second measuring marks and/or the second deviations of the second measuring marks at the second positions. Furthermore, this printing system should also include a calculating system for calculating the adjusted deviations. This means that the adjusted deviations can be calculated, and made available, through the use of the calculating system using the information from the second positions and the second deviations.

In accordance with a concomitant feature of the invention, the printing system according to the invention should also include a display device, in order to display the adjusted deviations, for example, in the form of numerical data and/or as graphic illustrations.

Other features which are considered as characteristic for the invention are set forth in the appended claims.

Although the invention is illustrated and described herein as embodied in a printing process and a system for ascertaining register defects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
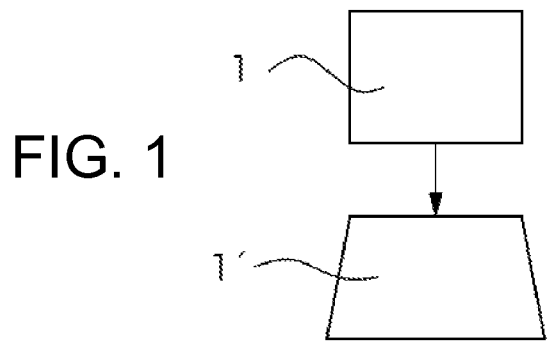
FIG. 1 is a diagrammatic, top-plan view showing the effect of a paper stretch on a printed image.

Referring now to the figures of the drawings in detail and first, particularly, to FIG. 1 thereof, there is seen an example of a geometrical distortion, i.e. in particular a stretch, of a paper sheet 1 as a printing material.

Figure 4:
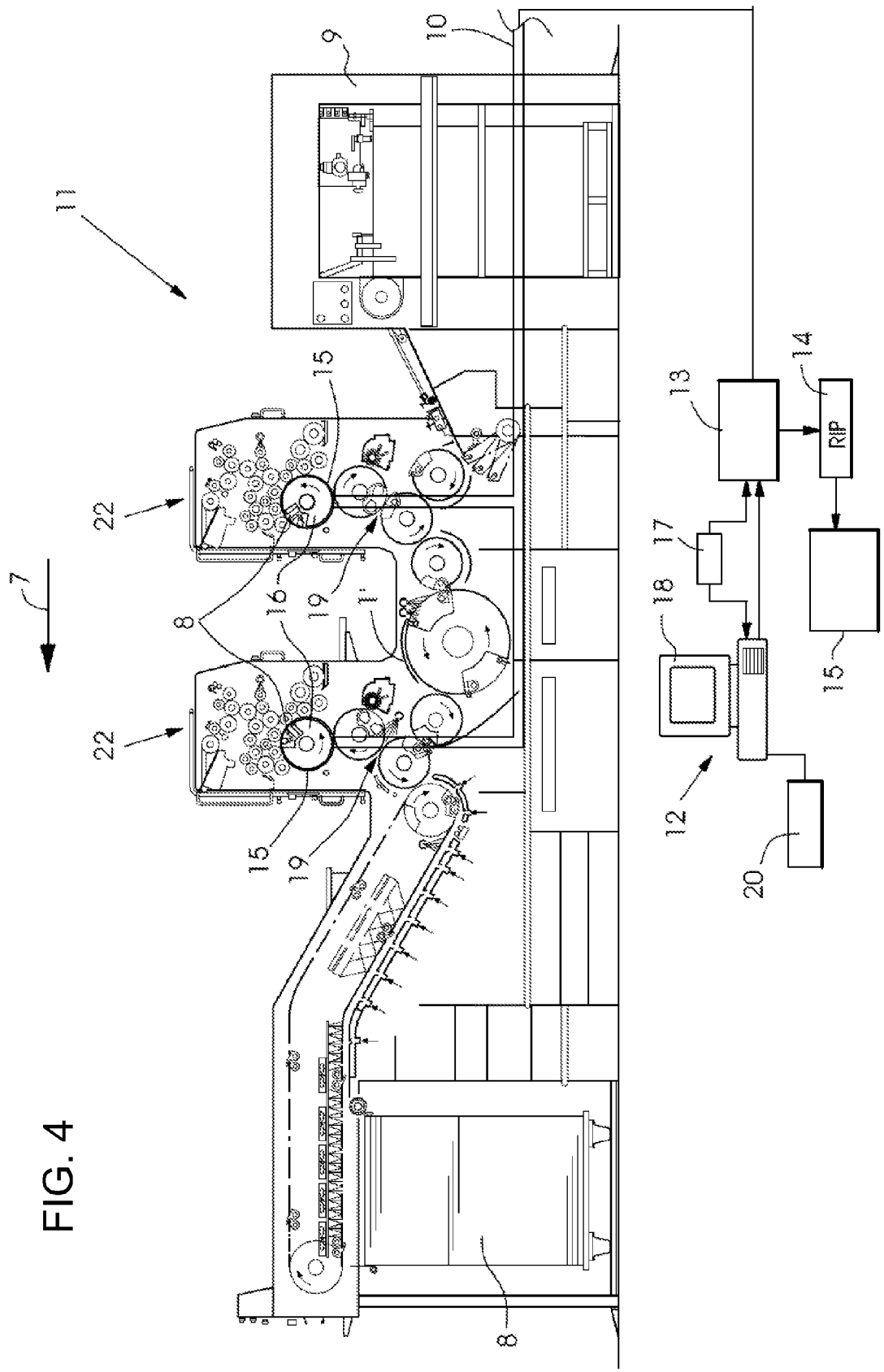
FIG. 4 is a longitudinal-sectional view of a printing system.

A non-printed paper sheet 1 is rectangular. When it has color applied to it, and is passed through one or more printing units, the paper sheet 1 becomes damp and is deformed by the printing nips. In this way, passage through a printing machine 11, as is illustrated, for example, in FIG. 4, gives rise to a trapezoidal paper sheet 1'.

Further possible geometrical defects of a printing material are mentioned in German Patent DE 197 24 066 B4, corresponding to U.S. Pat. No. 6,024,504, to which reference is hereby made.

Figure 2:
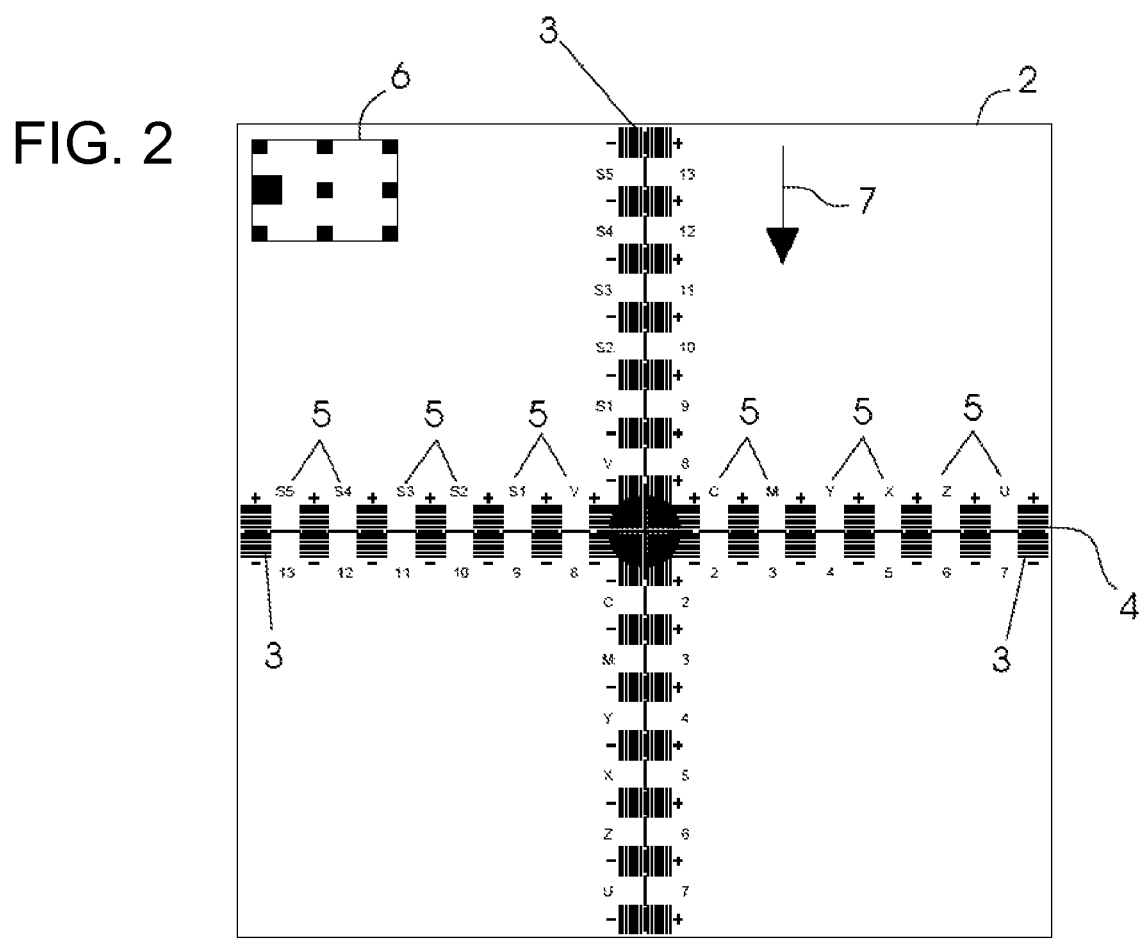
FIG. 2 is a top-plan view showing an example of a measuring mark.

FIG. 2 illustrates a composition of a measuring mark 2. The precise functioning of the measuring mark 2, and possible alternative embodiments thereof, are described in German Patent Application DE 10 2009 019 591 A1, to which reference is hereby made with respect to the measuring mark 2, the evaluation thereof and possible alternative embodiments.

The position of the measuring mark 2 on a sheet 1 is illustrated symbolically by a position marking 6. In the case illustrated therein, nine positionings of the measuring mark 2 on a sheet 1 are possible. The measuring mark 2 illustrated therein assumes the position in the left-hand center of the printing material 1, as is illustrated by the enlargement in the position marking 6. A preferred direction of the printing material 1 is predetermined in this case by a movement direction 7 of the printing material in the printing machine 11. The possible positions for the measuring mark 2, which are illustrated in the position marking 6, are each assigned quite precise first positions. The first positions of the measuring marks 2 on the paper sheet 1 are always assigned by relative positioning on the paper sheet 1, but may also be defined in the form of relative positioning in relation to the printing copy used for the purpose of printing the paper sheet 1.

The measuring mark 2 has a plurality of measuring scales 3, which extend in the movement direction 7 and transversely thereto. In this case, each measuring scale 3 is assigned to a color separation, which is depicted by color codings 5 being indicated within the measuring mark 2. The measuring scales 3 each have a color line 4 disposed centrally in relation to color separations without relative register deviations. The color line 4 corresponds to that color of the color separation which is assigned by the color coding 5.

Register deviations both in the movement direction 7 and transversely thereto shift the color line 4 within the measuring scale 3. This color line is then printed on, or between, two other lines of the measuring scale 3. The register deviation of the color separation in relation to the standard color, which is given by the color of the measuring scale 3 itself and is preferably black (K), is that line of the measuring scale 3 which is closest to the actual position of the color line 4. The measuring scale 3 has preceding signs in each case which can be assigned to the register deviation.

The thus ascertained deviations of the individual color separations for the respective first positions of the measuring mark 2 on the printing material 1 are input into an operating console 12 of the printing machine 11. As an alternative, they may also be input into the printing copy in the vicinity of a platesetter. These first deviations in relation to the register of the individual color separations at the first positions of the first measuring marks 2 are transferred to a correction device 13. This correction device 13 determines, from the first deviations, a first correction function, which is passed on to a platesetter or RIP 14. Using matrix-manipulation devices which are provided, the platesetter or the RIP 14 then generates, as described in German Patent DE 197 24 066 B4, corresponding to U.S. Pat. No. 6,024,504, corrected raster bit maps or corrected printing plates 15, which are used in plate cylinders 16 of the printing machine 11. Platesetters and RIPs may be constructed separately or together, and are therefore provided in this case with the joint reference numeral 14.

Figure 3:
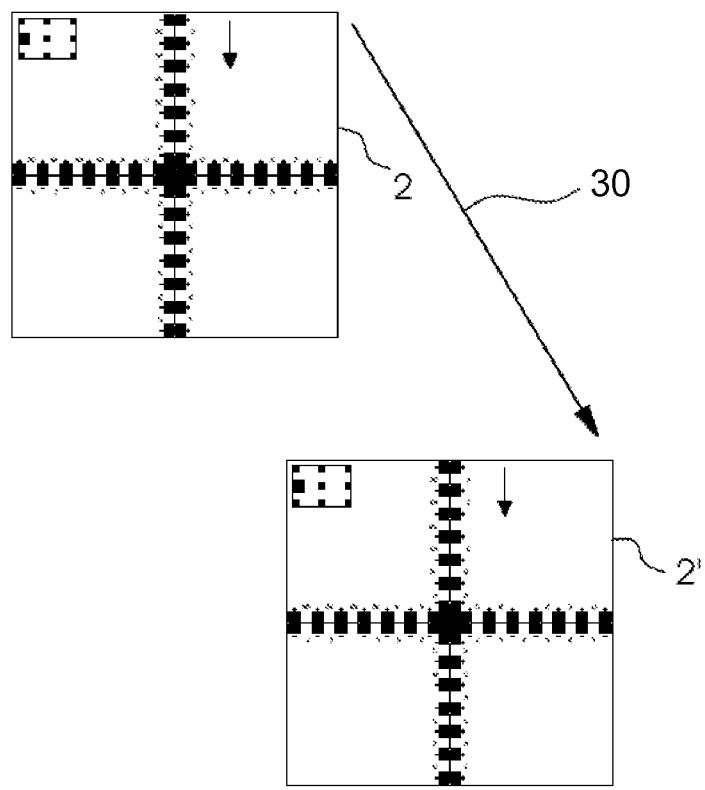
FIG. 3 is a top-plan view showing a positional deviation of a measuring mark in a follow-up print.

The printing copies, which are used as a copy for producing the first corrected printing plates 15, necessitate or allow a configuration of the first measuring marks 2 as indicated in the position marking 6. If a new printing copy, different from the first, is fed to the platesetter or the RIP 14, then it is not always possible for the first measuring marks 2 to be disposed precisely in accordance with the position marking 6 on the color separation, i.e. on the printing plate 15. The first measuring mark 2 is then disposed at a second position, different from the first position, as a second measuring mark 2', as is illustrated in FIG. 3. The first measuring mark 2 is thus shifted by a vector 30, which may have elements both in the movement direction 7 and transversely thereto, and is thus imaged as a second measuring mark 2' on the printing plate 15 through the use of the platesetter 14 and printed onto a paper sheet 1.

In order to generate the second printing plates 15 in accordance with the second printing copy, use is already made of the aforementioned first correction function in the RIP or platesetter 14, in order to correct a paper stretch, as was detected for the first printing copy or the first printed image, for the second printing copy, i.e. for the second printed image. Ideally, therefore, within the second measuring marks 2', it should not be possible to detect any register deviations through the use of the measuring scales 3 for the different printing colors, represented by the color codings 5.

Figure 5:
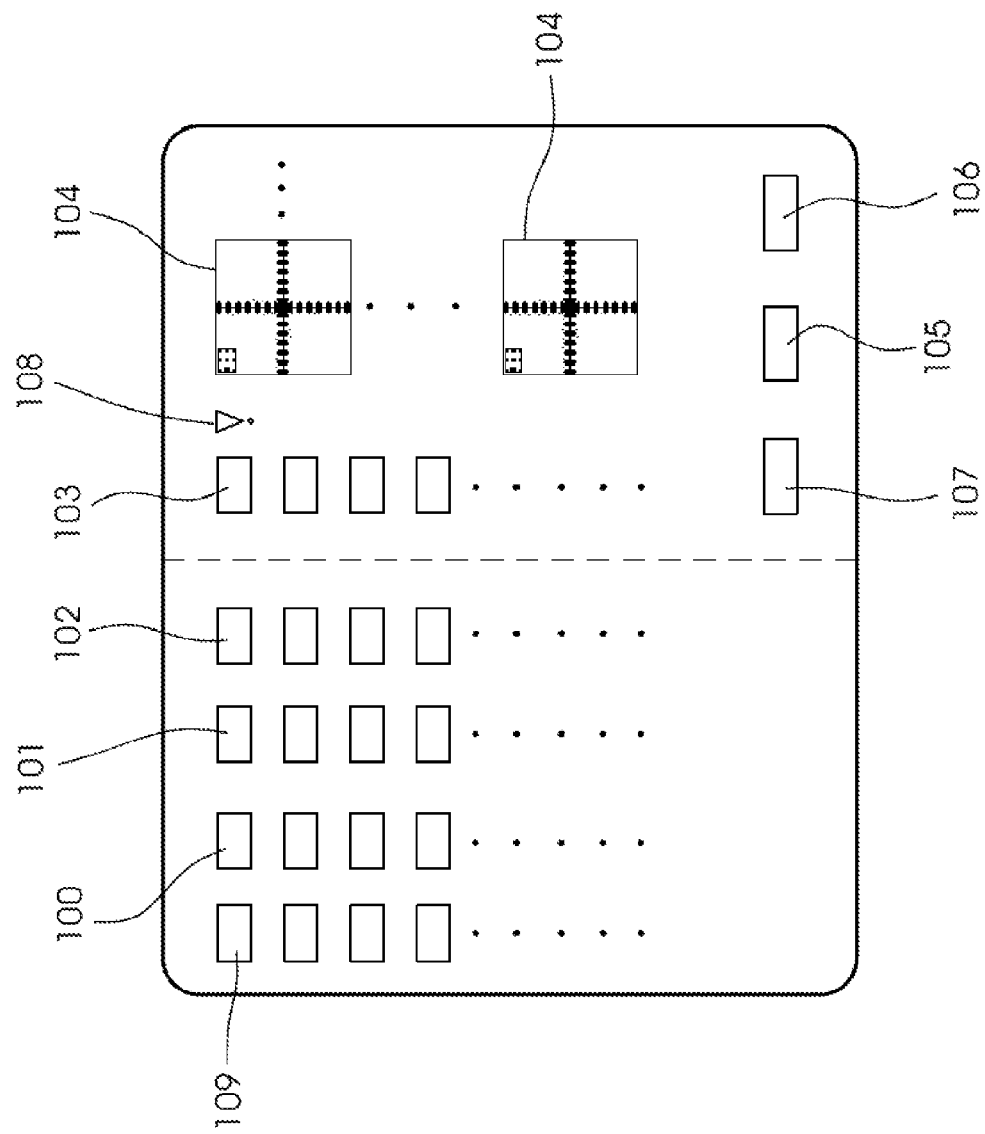
FIG. 5 is an elevational view of a monitor display with input and output elements.

It is nevertheless possible, during the second printing process, for external influences, e.g. the quantity of printing colors used, different printing copies, different color-zone settings, to give rise to register deviations, caused by paper stretching different from the paper stretch in the first printing process. These register defects can then, as described, be read in the second measuring marks 2'. For the purpose of inputting these detected second deviations of the second measuring marks 2', the operating console 12 has third input fields 102 in each case. The operating console 12 also has second input fields 101 for inputting the second positions of the second measuring marks 2'. A corresponding input mask is shown in FIG. 5. These data relating to the second deviations of the second measuring marks 2' at the second positions on the sheet 1 are passed on to a calculating system 17, as is illustrated in FIG. 4 in the vicinity of the printing machine 11. The calculating system 17 ascertains adjusted deviations due to an interpolation function, which may, for example, be linear or may also correspond to the first correction function. The calculating system 17 thus uses the second deviations of the second measuring marks 2' at the second positions on the sheet 1 to interpolate in each case adjusted deviations of the first measuring mark 2, as would be expected at the first positions on the paper sheet 1. These adjusted deviations are then passed on, like new measuring values, for example to the correction device 13, which determines a corrected second correction function, which can be used as a basis for new imaging of the printing plates 15 in accordance with the second printing copy. It is thus possible to reduce the thus ascertained register deviations of the individual color separations during the second printing operation.

FIG. 4 illustrates at least parts of a printing system which serve for carrying out a process in which adjusted deviations are ascertained and technical measures are implemented.

As is illustrated in FIG. 4, the operating console 12 has a monitor 18, on which these adjusted deviations can be displayed, as an alternative, or in addition, to the adjusted deviations being passed on to the correction device 13 by the calculating system 17. The adjusted deviations in this case may be displayed, in the form of numerical values, as first display fields 103 in dependence on the first positions of the first measuring marks 2, or the measuring marks 2 themselves can be represented, in particular in enlarged form, as second display fields 104 on the monitor 18 and the adjusted deviations can be represented as deviations of the color lines 4 within the measuring scales 3. The adjusted deviations being displayed make it possible for an operator, by operating first, second or third authorization elements 105, 106, 107, to decide on how the printing process will proceed. Corresponding input/output or display fields 100 to 104 and the authorization elements 105 and 106 are illustrated in FIG. 5.

As is further illustrated in FIG. 4, it is also possible for the adjusted deviations to be converted, by the correction device 13, into activation signals for the printing machine 11. These activation signals are then transferred to a communications connection 10. The communications connection 10 is connected to servomotors 8 for the purpose of correcting paper stretches or other register defects within the printing machine 11. These servomotors 8 are located directly on the plate cylinders 16 and can expand the printing plates 15 on the plate cylinders 16 both longitudinally and transversely in relation to the movement direction 7. This means that the servomotors 8, which are activated by the communications connection 10 in accordance with the data from the first correction device 13, cannot correct any register defects due to the paper stretch even within the printing machine 11 itself.

As is illustrated in FIG. 4, the printing machine 11 has at least two printing units 22, in which two colors are printed one above the other. Sheets 1 are separated by a feeder 9 and fed to the printing units 22. The printing color is then transferred in printing nips 19, and therefore, in a first printing unit 22, a first color, for example black (K), is applied to a sheet which is not, in the first instance, subjected to any stretching. The pressure applied in the first printing unit 22 and the moisture of the printing color used in this case cause the sheet 1 to be stretched trapezoidally, as is illustrated in FIG. 1 by the paper sheet 1'. This paper sheet 1' is then guided further through the printing machine 11 in the movement direction 7. The paper sheet 1' which is stretched in this way passes through a second printing nip 19, in which a second color is applied in the second printing unit 22. The color separation in this case takes place in accordance with the exposed printing plate 15, which is clamped in the plate cylinder 16. If the paper stretch has not been compensated for in any way, this results in the above-described register deviations, which can be detected in the measuring marks 2. It is possible to correct these register deviations or errors, as described, by matrix-manipulation devices, by way of corresponding corrections in the exposed printing plates 15 through the use of the RIP 14. The printed image which is to be transferred onto the printing plate 15 is adjusted to the distortion of the sheet 1'. As described, it is also possible for further distortions to be compensated for by virtue of the printing plates 15 being expanded through the use of the servomotors 8 themselves.

When use is made of second printing copies, as described, the measuring marks 2' are provided at second positions on the printing plates 15. Register defects which are still present can then be detected by second deviations, which are converted into adjusted deviations and are then correspondingly displayed and/or used in order to image new printing plates 15 or to activate the servomotors 8 correspondingly through the communications connection 10.

FIG. 5 illustrates a display of the monitor 18.

The display has first input fields 100. The first deviations of the first measuring mark 2 can be entered in these first input fields. It is also possible for these data for the first deviation to be transferred to the operating console 12 from a separate workstation, through a corresponding non-illustrated dataline, and to be entered automatically into the first input fields 100.

The second positions of the second measuring marks 2' can be entered in second input fields 101. The ascertained second deviations of the second measuring marks 2' are entered in third input fields 102. For this purpose, the operating console 12 has input elements in the form of a keyboard 20. The second positions are already known for the operation of imaging the second printing plate 15 and can therefore also, as an alternative, be routed from the printing copy to the operating console 12 directly or indirectly through MIS. It is then possible to dispense with the second positions being displayed.

The data relating to the second positions and second deviations of the second measuring marks 2' are passed on, as described, to the calculating system 17. The calculating system 17 uses these data to calculate adjusted deviations. These adjusted deviations are communicated back to the operating console 12, where they are displayed, in turn, on the monitor 18. First display fields 103 are provided for this purpose, with the adjusted deviations for the first measuring marks 2 being displayed thereon. The operator can then compare the adjusted deviations, for example, with explanatory values.

It is also possible for the first input fields 100 to no longer have been displayed in a process step in which second printing copies were used for the purpose of generating printing plates 15. The first input fields 100 for the first deviations are intended exclusively to ascertain deviations on the paper sheet 1, 1' which have not yet been compensated for, in order to then generate a corresponding first correction function by the correction device 13. For this purpose, the calculating system 17 is specifically not supplied with the values from the first input fields 100.

In addition, or as an alternative, to the numerical data in the first display fields 103, which display the adjusted deviations of the second measuring marks 2' in the first measuring marks 2, second display fields 104 are also provided, and these display the first measuring marks 2. It is possible, from the adjusted deviations of the first measuring marks 2, to display corresponding representations of the color lines 4 within the measuring scales 3 for the different colors within a representation of the first measuring mark 2 as a displayed second display field 104. The operator is thus readily able to assess the register defect which is still present.

Furthermore, first, second and third authorization elements 105, 106, 107 are displayed on the monitor 18. By operating the first authorization element 105, the operator can authorize the printing operation to continue without any further corrections of the printing plates 15. By actuating the second authorization element, the operator can cause new printing plates 15 to be generated by the platesetter or the RIP 14. For this purpose, as described, the adjusted deviations are then transferred from the calculating system 17 to the correction device 13. These data can also, then, be transferred directly from the operating console 12 to the correction device 13, since the bidirectional connection between the operating console 12 and calculating system 17 means that they are also present in this case. These adjusted deviations are used to generate a second correction function, which is intended for use in a matrix-manipulation device of the RIP or platesetter 14, and through the use of which new corrected printing plates 15 are imaged in accordance with the color separations of the printing copy.

The monitor 18 may also have third authorization elements 107, which exclusively predetermine use of the adjusted deviations for activating the servomotors 8 for expanding or extending the printing plates 15 within the printing machine 11.

In addition, it is also possible for further optical displays, e.g. red exclamation marks 108, to be displayed on the monitor 18 as a visual warning to indicate that the adjusted deviations have exceeded predetermined limit values. In addition, or as an alternative, to the optical display elements in the form of the exclamation marks 108, it is also possible for acoustic signals to be output. The limit values for the adjusted deviations can be stored on a fixed basis in the system or can be predetermined by an operator by way of fourth input fields 109, which can be displayed on the monitor 18 in a certain disconnected mode of the system.

In this way, ascertaining the adjusted deviations by the calculating system 17 makes it possible to implement various technical measures which allow an operator to decide which further technical measures should yet be implemented, for example ignoring the register deviations, correcting the register deviations by servomotors 8, breaking off the entire printing operation or generating new printing plates 15 by using the first correction device 13 to calculate a second correction function. It is possible for these decisions of the operator at least to be assisted, in accordance with the adjusted deviations, by optical elements, such as a red exclamation mark 108 or acoustic information.

This allows an operator possibly to improve the quality of the printed image which is generated by the printing plates 15.

It should be pointed out that, in alternative embodiments, it is also quite possible to provide that the first measuring marks 2 and second measuring marks 2' being used may also be composed completely differently. In particular, it is also the case that there is no need for the number of measuring marks 2 at the first positions to correspond to the number of measuring marks 2' at the second positions. It is possible to use both more and fewer second measuring marks 2', which are then combined, possibly through the use of the calculating system 17, to give an adjusted deviation in the form of an average or, starting from a second deviation, are increased to a number of adjusted deviations, or it is possible simply to dispense with the operation of ascertaining a certain number of adjusted deviations.

Of course, exposure of the printing plates can also take place directly within the printing machine.

The invention claimed is:

1. A process for printing a printing material, the process comprising the following steps:
    coupling a first printing copy to first measuring marks for ascertaining register deviations;
    assigning the first measuring marks to first positions;
    placing each of the first positions outside motif regions or repeats of the first printing copy;

generating first color separations by screening the first printing copy together with the first measuring marks;

imaging first printing formes based on the first color separations;

printing a printing material in a printing machine using the first printing formes;

measuring the first measuring marks on the printed printing material and ascertaining first deviations of the first measuring marks, with the first deviations constituting a measure of register deviations between color prints;

determining a first correction function based on the first deviations;

using the first correction function to adjust at least one of the first color separations or printing formes to the register deviations and thus at least to reduce register defects;

assigning second measuring marks at second positions different from the first positions to second printing copies;

generating second color separations by screening the second printing copies with the second measuring marks;

imaging second printing formes based on the second color separations;

printing a printing material in a printing machine using the second printing formes;

using the first correction function before, during or after the screening of the color separations or the imaging of the printing formes;

ascertaining second deviations of the second measuring marks at the second positions different from the first positions;

determining adjusted deviations of the first measuring marks at the first positions based on the second deviations of the second measuring marks at the second positions different from the first positions;

displaying the adjusted deviations as a numerical value on a monitor;

signaling optically when one or more adjusted deviations, individually or together, exceed a predetermined limit value; and implementing at least one further technical measure using the adjusted deviations.

2. The process according to claim 1, which further comprises selecting the at least one further technical measure as at least one measure selected from the following group:

displaying the adjusted deviations as graphic illustrations of the first measuring marks on a monitor;

signaling acoustically when one or more adjusted deviations, individually or together, exceed a predetermined limit value;

authorizing further technical measures for activation by a user with authorization elements;

determining an adjusted correction function, using the adjusted deviations, to adjust at least one of the second or further color separations or printing formes to the register deviations and thus to further reduce register defects of a following printing process or of printing processes beyond the following printing process.

3. The process according to claim 1, which further comprises determining the adjusted deviations by using an interpolation function.

4. The process according to claim 1, which further comprises determining the adjusted deviations by using the first correction function.

5. The process according to claim 1, wherein the ascertained and/or corrected register deviations are defects of a printed image generated due to a paper stretch in individual printing units.

6. The process according to claim 1, which further comprises predetermining or selecting the second positions by an operator within a pre-press stage in vicinity of a platesetter.

7. The process according to claim 6, which further comprises transmitting the second positions, within a file or a data stream, directly to the printing machine or indirectly, through a management information system, to the printing machine.

8. The process according to claim 1, which further comprises inputting at least one of the second positions or second deviations at an operating console of the printing machine or transferring at least one of the second positions or second deviations to the operating console of the printing machine, and implementing the further technical measures in vicinity of the printing machine.

9. The process according to claim 1, wherein the first and second measuring marks are identical.

10. A printing system for printing a printing material, the printing system comprising:
    a printing machine;
    a printing-forme-imaging device;
    a raster image processor for screening printing copies and generating color separations;
    first input fields for inputting first deviations of a non-corrected print for carrying out a process according to claim 1;
    at least one of second input fields for inputting or determining the second positions of the second measuring marks or third input fields for inputting the second deviations of the second measuring marks at the second positions; and
    a calculating system for calculating adjusted deviations from the second deviations in conjunction with the second positions.

11. The printing system according to claim 10, which further comprises a display device for displaying the adjusted deviations of the first measuring marks at the first positions including at least one of the first display fields for displaying the adjusted deviations in the form of numerical data or the second display fields for displaying the adjusted deviations in the form of graphic illustrations of the adjusted deviations in a representation of the first measuring marks.

* * * * *